United States Patent [19]

Fletcher et al.

[11] 3,729,736

[45] Apr. 24, 1973

[54] CODE REGENERATIVE CLEAN-UP LOOP TRANSPONDER FOR A μ-TYPE RANGING SYSTEM

[76] Inventors: James C. Fletcher, Administrator of the National Aeronautics and Space Administration with respect to an invention of; William J. Hurd, La Canada, Calif.

[22] Filed: Nov. 8, 1971

[21] Appl. No.: 196,399

[52] U.S. Cl. ....................343/6.5 R, 343/6.8 R

[51] Int. Cl. ....................G01s 9/56

[58] Field of Search ....................343/6.8 R, 6.8 LC, 343/6.5 R, 6.5 LC

[56] References Cited

UNITED STATES PATENTS 3,076,190 1/1963 Shames et al....................343/6.8 LC 3,683,279 8/1972 Weinberg et al....................343/6.8 R

*Primary Examiner*—Benjamin A. Borchelt

*Assistant Examiner*—G. E. Montone

*Attorney*—Monte F. Mott et al.

[57] ABSTRACT

A loop transponder for regenerating the code of a μ-type ranging system is disclosed. It includes a phase locked loop, a code generator and a loop detector. The function of the phase locked loop is to provide phase lock between a received component $w_k$ of the range signal and a replica $\hat{w}_k$ of the received component, provided by the code generator. The code generator also provides a replica of the next component $\hat{w}_{k+1}$. The loop detector responds to $w_k$, $\hat{w}_k$ and $\hat{w}_{k+1}$ to determine when the next component $w_{k+1}$ is received and controls the code generator to supply $\hat{w}_{k+1}$ to the phase locked loop and to generate a replica $\hat{w}_{k+2}$ of the next component.

10 Claims, 7 Drawing Figures

WILLIAM J. HURD
INVENTOR.

BY Paul F. McCaul

ATTORNEYS

INVENTOR.
WILLIAM J. HURD
BY

ATTORNEYS

INVENTOR.
WILLIAM J. HURD
BY Paul F. McCaul
ATTORNEYS

Patented April 24, 1973 3,729,736

4 Sheets-Sheet 4

WILLIAM J. HURD
*INVENTOR.*

*BY* [signature]

ATTORNEYS

CODE REGENERATIVE CLEAN-UP LOOP TRANSPONDER FOR A $\mu$-TYPE RANGING SYSTEM

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

The present invention is generally directed to a ranging system and, more particularly, to a code regenerating transponder in a ranging system.

Ranging systems are used extensively to determine the range or distance of an object, such as a spacecraft, from a fixed station on Earth. Typically, the system includes a transponder in the spacecraft which receives a ranging signal from Earth and retransmits it to Earth. A major drawback of the present transponders is that the noise on the received ranging signal and the transponder's receiver noise modulate the transponder's transmitter. Consequently, the down-link transmitted signal includes, in addition to the ranging signal or code, the up-link noise and the transponder's receiver noise. Alternately stated, the received ranging signal, which includes the range code, transmitted to the spacecraft, and noise on the up-link and the receiver noise modulate the down-link transmitter together. Since the transponder's transmitter power is severely limited, the modulating noise greatly reduces the down-link signal-to-noise ratio (SNR), thereby reducing the ranging accuracy as well as increasing the time needed to obtain the ranging information. These difficulties are expected to increase in magnitude as the range of spacecraft on future space exploration is expected to increase.

OBJECTS AND SUMMARY OF THE INVENTION

It is a primary object of the present invention to provide improvements in ranging systems.

Another object of the invention is to provide an improved transponder in a ranging system.

A further object of the present invention is to provide a transponder in a ranging system with increased down-link SNR without increase in transmitter power.

Still a further object of the present invention is to provide a transponder in a ranging system which retransmits a range code received thereby without the noise which was received by the transponder's receiver together with the range code, and without the transponder's receiver noise.

These and other objects of the present invention are achieved by providing a code regenerative clean-up loop in a transponder which forms part of a binary coded sequential code-component ranging system, which has been referred to in the literature as the $\mu$-system. One article in which such a system is described is entitled "A Binary-Coded Sequential Acquisition Ranging System" by W. L. Martin, published in Proceedings of the Third International Conference in System Sciences, University of Hawaii, Honolulu, January 1970.

In the $\mu$-system, square waves at successively lower frequencies are transmitted sequentially. First the range is measured to high resolution but with a time ambiguity equal to the time of one cycle of the highest frequency component. Then a frequency component at half the frequency of the preceding component is transmitted and half the ambiguity is eliminated. Lower and lower components or frequencies are transmitted until all ambiguities are resolved. In accordance with the present invention the clean-up loop of the transponder operates by phase locking on each code component frequency as it is received by the spacecraft. A squarewave in phase with the received signal is generated and is used to modulate a down-link carrier which is transmitted to Earth. Briefly, the clean-up loop determines when the received signal changes from one code component to the next, makes a binary decision as to the phase of the new code component, and changes the phase locked loop (PLL) reference signal to track the new component.

The novel features that are considered characteristic of this invention are set forth with particularity in the appended claims. The invention will best be understood from the following description when read in conjunction with the accompanying drawings.

DESCRIPTION OF THE PREFERRED EMBODIMENTS

Figure 1:
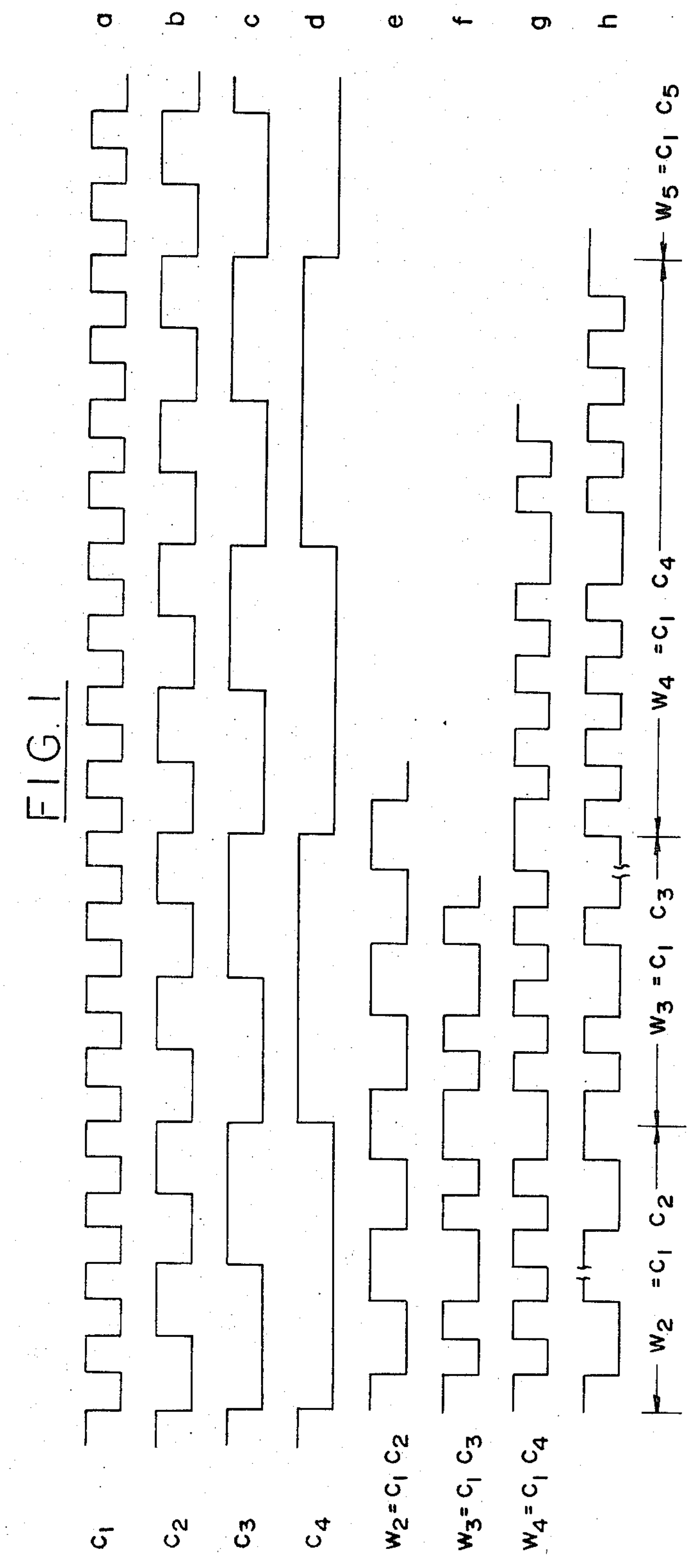
FIG. 1 is a multiline waveform diagram, useful in explaining the components of the range signal in a $\mu$-type ranging system.

Before proceeding to describe the novel clean-up loop reference is first made to FIG. 1 which is a multiwaveform diagram useful in describing the signal format, used in the $\mu$-system. Basically, it consists of square waves at successively lower frequencies which are transmitted sequentially. In lines *a–d* four different waveforms of square waves are diagrammed and are designated $c_1$ through $c_4$ respectively. The frequency $f$ of each is one-half the frequency of the waveform designated by the next lower subscript. Thus, $f_{c_4} = \frac{1}{2} f_{c_3}$, $f_{c_3} = \frac{1}{2} f_{c_2}$, etc. For simplicity the frequencies $f_{c_1}$, $f_{c_2}$, etc., will be referred to as $c_1$, $c_2$, etc. In practice $c_1$ is not transmitted by itself but serves as a suppressed subcarrier which is phase modulated by the other square waves. In lines *e, f* and *g*, signal components $w_2$, $w_3$ and $w_4$ are diagrammed, where $w_2 = c_1 \cdot c_2$, i.e., $c_1$ is modulated by $c_2$, $w_3 = c_1 \cdot c_3$ and $w_4 = c_1 \cdot c_4$.

In the $\mu$ system the up-link range signal consists of components $w_2$, $w_3$, etc., as shown in line *h*. In practice, the first component $w_2$ is transmitted to the spacecraft for a time long enough for the clean-up loop to acquire frequency and phase lock on this component. Following $w_2$ the transmitter sequentially transmits $w_3$, $w_4$, etc. Each of these components is also transmitted for a period long enough to enable the novel clean-up loop to determine when the receiver signal changes from $w_k$ to $w_{k+1}$ (where $k$=2, 3, 4, etc.), make a binary decision as to the phase of $w_{k+1}$ and control the phase of the reference signal generated in the loop to track the new component. By performing these functions the reference signal, generated in the loop, is a replica of the received signal without the noise received therewith and without the receiver noise. It is the replica signal which is transmitted in the down-link. Since it is not affected by the up-link noise or receiver noise, the down-link SNR is greatly increased without increase in transmitter power.

Figure 2:
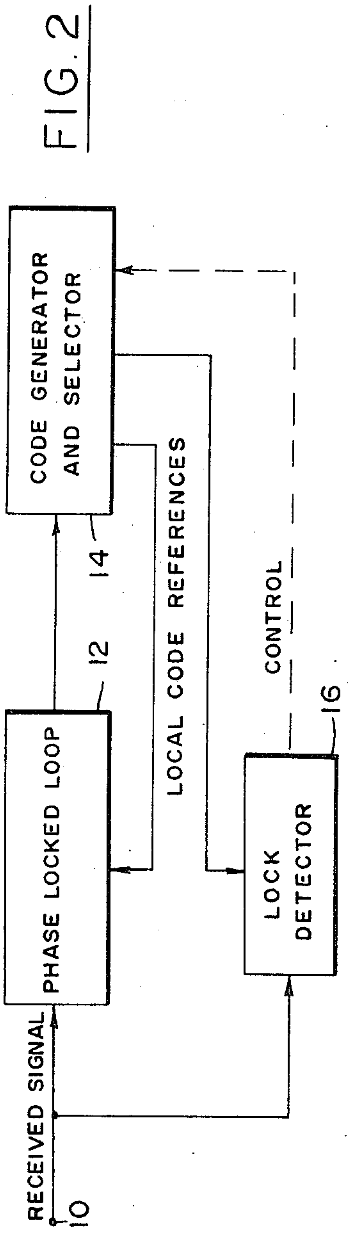
FIGS. 2 and 3 are respectively simplified and more detailed block diagrams of the present invention.

Attention is now directed to FIG. 2 which is a simplified block diagram of the novel clean-up loop. Therein the received signal plus the up-link noise and the receiver noise is assumed to be received at terminal 10. Since in many transponders used in space vehicles, such as the Mariner-type transponders, the received signal is readily available at the output of a hard limiter, the input at terminal 10 is assumed to be binary. This simplifies the implementation of the loop and the lock detectors, since products can be realized with Exclusive-Or gates, and additions and accumulations can be achieved with counters.

The input signal at terminal 10 is supplied to a phase locked loop (PLL) 12 which is connected to a code generator and selector 14. The latter, which may be referred to simply as generator 14, supplies the replica code, whose phase is compared with the received signal phase by the PLL 12. The receiver input signal and signals from generator 14 are used by a lock detector 16 which determines the derived component and its phase which should be supplied to PLL 12 by generator 14.

Figures 3, 4, 5:
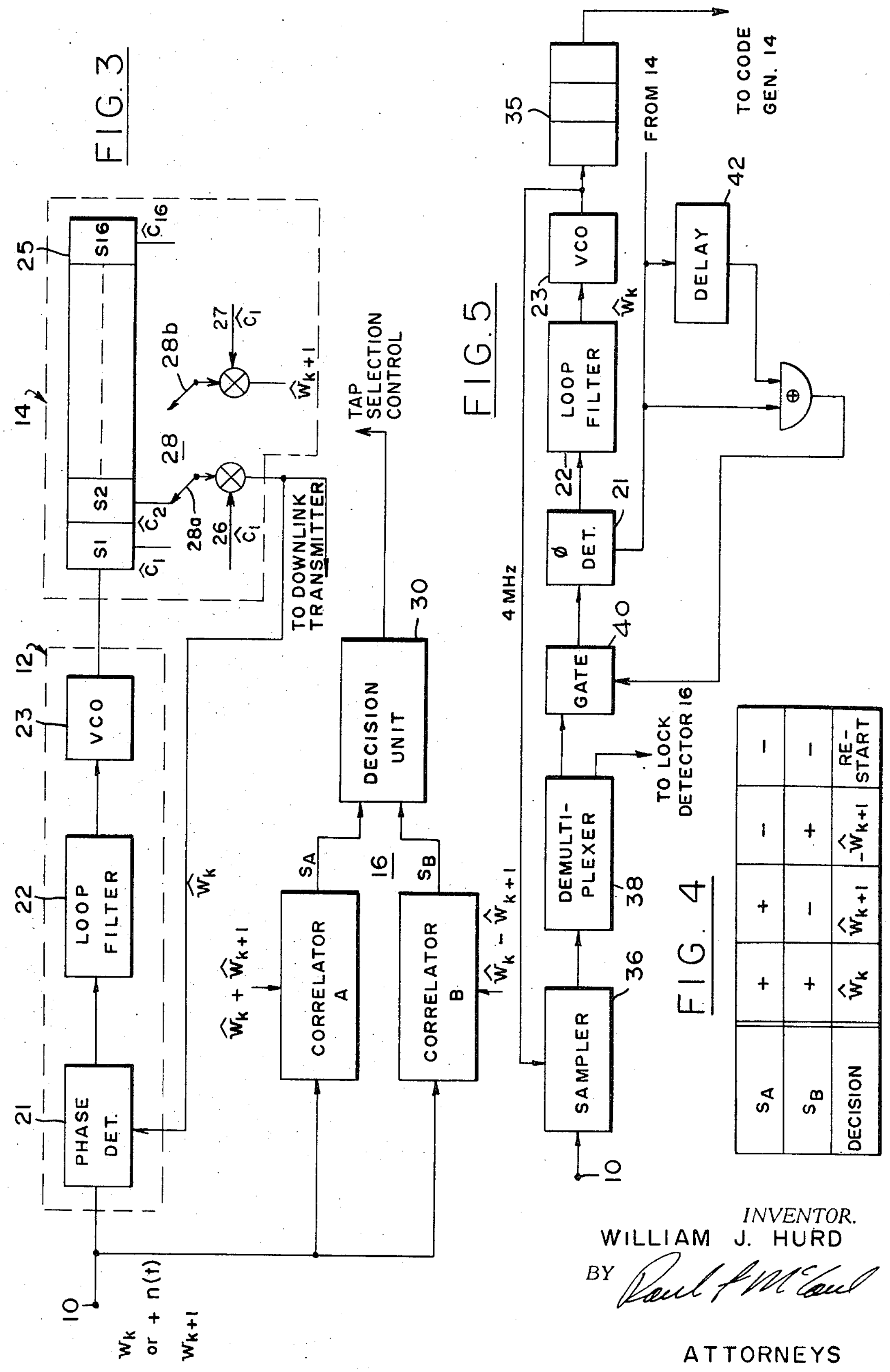
FIG. 4 is a chart of the decision criteria employed in a lock detector, shown in FIG. 3.
FIG. 5 is a partial diagram useful in explaining an embodiment in which sampling is employed.

FIG. 3 is a block diagram in which the circuitry diagrammed in FIG. 2 is shown in greater detail. The PLL 12 is shown comprising a phase detector 21, a loop filter 22 and a voltage controlled oscillator (VCO) 23. These circuits form part of any known PLL. However, whereas in the prior art the output of the VCO is fed back to the phase detector, in the present invention the feedback signal is an output of the generator 14.

The latter comprises a multistage counter 25, a pair of multipliers 26 and 27, and a selector arrangement, or simply selector, designated by numeral 28 and represented by two switches 28*a* and 28*b*. The function of the selector 28 is to connect the multipliers 26 and 28 to the proper taps of two appropriate stages of counter 25. The latter is shown including 16 stages designated S1–S16, for an implementation in which the last component is $w_k = c_1 \cdot c_{16}$.

When proper lock is obtained the frequencies of the square wave inputs of stages S1–S16 are $\hat{c}_1$–$\hat{c}_{16}$ respectively, corresponding to the frequency components $c_1$–$c_{16}$ of the received signal. For this reason the output taps of those stages are designated as $\hat{c}_1$–$\hat{c}_{16}$.

Multiplier 26 multiplies $\hat{c}_1$ by the output of the stage to which it is connected by switch 28*a*. Its output which is designed $\hat{w}_k$, where $k$ is the stage number to which it is connected, is supplied to the phase detector 21 and to the down-link transmitter as the replica component of the range signal. Multiplier 27 multiplies $\hat{c}_1$ by the output of the stage to which it is connected by switch 28*b*. It is connected to the stage following the one connected to multiplier 26, i.e., $k$+1. Thus the output of multiplier 27 is $\hat{w}_{k+1}$.

The received signal at terminal 10, in addition to being supplied to detector 21, is also supplied to two correlators A and B which form part of the lock detector 16. Correlator A correlates the received signal component with the algebraic sum of the outputs of multipliers 26 and 27, i.e., with $\hat{w}_k + \hat{w}_{k+1}$ and provides an output $S_A$ to a decision unit 30. Similarly, correlator B correlates the received signal component $w_k$ with $\hat{w}_k - \hat{w}_{k+1}$, and supplies an output $S_B$ to a decision unit 30. The latter, based on the relative polarities of $S_A$ and $S_B$ controls the taps which are connected to the two multipliers and the phase of the waveform, supplied to multiplier 26.

The operation of the clean-up loop may best be explained with a specific example. Let it be assumed that the received signal component is $w_2$, i.e., k=2, and that the loop is locked to this component so that $\hat{w}_k$ is $\hat{w}_2$ and $\hat{w}_{k+1}$ is $\hat{w}_3$. That is, switch 28*a* connects tap $\hat{c}_2$ to multiplier 26 and switch 28*b* connects $\hat{c}_3$ to multiplier 27. As long as $w_2$ is tracked the polarities of both $S_A$ and $S_B$ are plus (+). When the next signal component $w_3$ is received the polarity of the output of one of the correlators remains + and the polarity of the other changes to minus (−). When this occurs the decision unit 30 controls selector 28 to switch each of switches to the next tap. Thus multiplier 26 is connected to $\hat{c}_3$, having been connected previously to $\hat{c}_2$, and multiplier 27 is connected to $\hat{c}_4$, since it was previously connected to $\hat{c}_3$. Thus the output of multiplier 26 becomes $\hat{w}_3 = \hat{c}_1 \hat{c}_3$. At this point a binary decision has to be made regarding the phase of $\hat{w}_3$ with respect to $w_3$. If $S_A$ is + and $S_B$ is −, the state of S3 with tap $\hat{c}_3$ is not disturbed. However, if $S_B$ is + and $S_A$ is −, it indicates a 180° phase shift between $w_3$ and $\hat{w}_3$. Consequently, S3 is complemented. The complementation is accomplished simply by inverting flip-flop S3.

The decision criteria for unit 30 in terms of the received $w_k$ and the two polarities $S_A$ and $S_B$ is summarized in the table shown in FIG. 4. Therein it is seen that when both $S_A$ and $S_B$ have minus polarities, it is indicated that the received signal is neither $\hat{w}_k$, $\hat{w}_{k+1}$ or $-\hat{w}_{k+1}$, and it is assumed that the ground transmitter has restarted the ranging procedure by switching back to $w_2$. This event could also be caused by a system malfunction.

It should be apparent that the determination of the phase relationships between the $c_k$'s (ignoring $c_1$ in the various $w_k$'s) correspond to resolutions of the ambiguities in the range measurement. Clearly the system resolution is limited by $c_1$, the highest frequency. Assuming that it is 500kHz, the range resolution is to within a fraction of one $\mu$ec, that fraction depending on the signal-to-noise ratio and duration of measurement. The lower and lower frequencies ($c_2$, $c_3$, etc.,) serve to resolve all other ambiguities with the period of lowest frequency corresponding to the maximum unambiguous range.

The phase detector 21 (see FIG. 3) is assumed to be of the transition tracking type. Thus, it provides an estimate of the sign of the error each time a transition occurs in the replica of the code component being tracked, i.e., in $\hat{w}_k$, which includes all of the transitions of $\hat{c}_1$ except when there is also a transition in $\hat{c}_k$, since $\hat{w}_k=\hat{c}_1\cdot\hat{c}_k$. For this reason the input signal is sampled at eight times the frequency $\hat{c}_1$, with every fourth sample occurring at a transition of $\hat{c}_1$. Every fourth sample is used by the phase detector 21 and the three samples between each transition of $\hat{c}_1$ are used by the lock detector 16. The sampling may be performed by a sampler connected between input terminal 10 and the phase detector 21. Assuming $\hat{c}_1$ to be 500 kHz, the samples may be clocked at 4 MHz by a local reference clock, synchronized with $\hat{c}_1$. If desired the output of the VCO may be used as the clock and a 3-bit counter, acting as a divider by 8, inserted between the VCO 23 and counter 25, so that the VCO runs at 4 MHz and the frequency of $\hat{c}_1$ is 500 kHz.

Such an arrangement is shown in FIG. 5 wherein the 3-bit counter is designated by numeral 35. It is connected between the VCO 23 and the code generator 14. The output of counter 35 is $\hat{c}_1$ and its input which is the output of the VCO 23 is a signal at the sampling frequency of 4 MHz. It is supplied to a sampler 36 which samples the input signal at terminal 10. The samples are supplied to a demultiplexer 38, which supplies every three samples to the lock detector 16 and every fourth sample to the phase detector 21. Preferably, the samples to the phase detector are supplied only when there is a transition in $\hat{w}_k$. To inhibit samples from reaching the phase detector when there is no transition in $\hat{w}_k$, a gate 40 is included. It is enabled only when the output of an Exclusive-OR gate 41 is true. The latter receives $\hat{w}_k$ and $\hat{w}_k$ delayed by a delay 42 so that when there is no transition in $\hat{w}_k$, the output of Exclusive-OR gate 41 is false and therefore gate 40 is closed.

Figure 6:
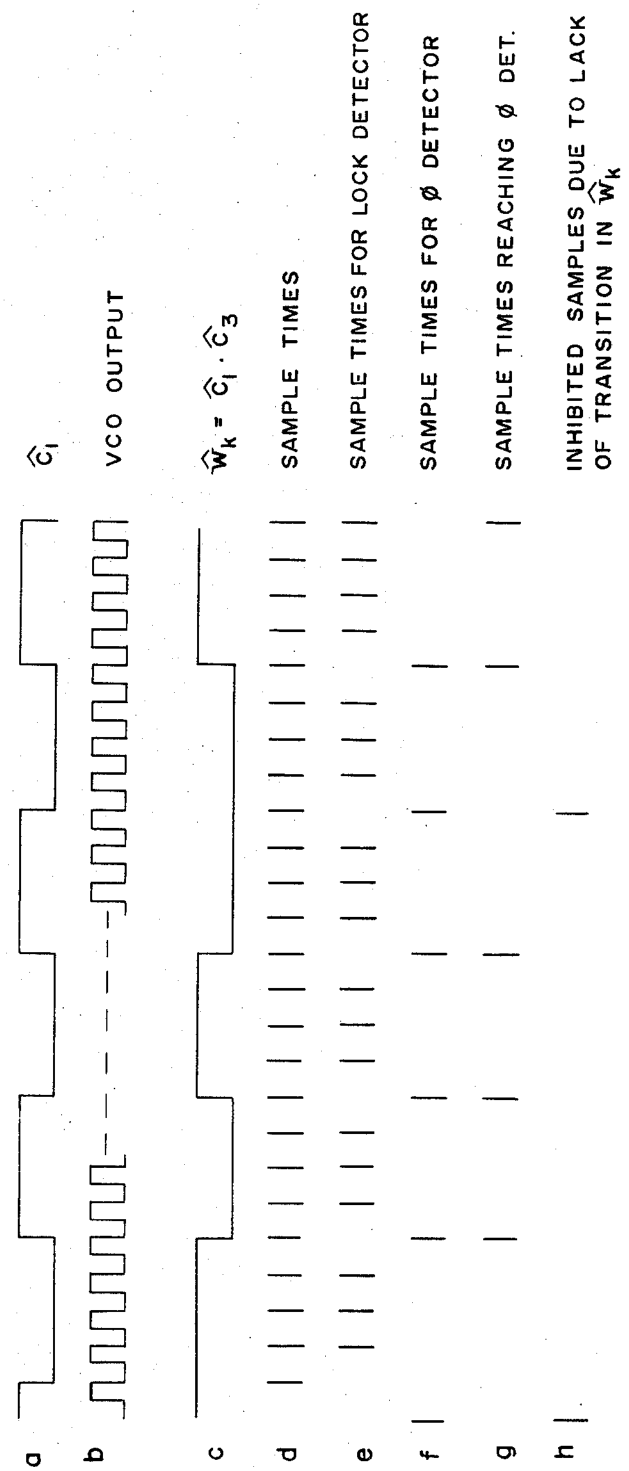
FIG. 6 is a multiline diagram useful in explaining the sampling technique.

The operation of the arrangement may be summarized in connection with FIG. 6 wherein lines *a*, *b* and *c* represent $\hat{c}_1$, the output of the VCO 23 and a $\hat{w}_k=\hat{w}_3=\hat{c}_1\cdot\hat{c}_3$. Line *d* represents the sample times of sampler 36 and line *e* represents the sample times for the lock detector 16. Lines *f* and *g* represent the times of the samples at the input and output of gate 40. Line *h* represents the times of the samples which are inhibited by gate 40 from reaching the phase detector.

It should be stressed that the sampling arrangement provides improved signal-to-noise ratio (SNR) at the cost of added complexity. If however, lower than optimum SNR can be tolerated, the sampling arrangement can be simplified by supplying all the samples of the input signal to both the phase detector 21 and the lock detector 16.

In practice each of the correlators A and B (see FIG. 3) of the lock detector 16 may be implemented as an Up-Down counter. Since each of $w_k$, $\hat{w}_k$ and $\hat{w}_{k+1}$ may be expressed as $\pm1$. $\hat{w}_k\pm\hat{w}_{k+1}$ is either $-2$, 0 or $+2$. When multiplied by $w_k$ which is $\pm1$, the product is $-2$, 0 or $+2$. When the product is 0 the counter content is not changed, i.e., no counting. One counts up on $+2$ and down on $-2$. Both correlators are reset after each decision of unit 30. The resetting may be performed after a selected number of samples, e.g., $2^{20}$, are supplied to each of the counters.

Such an arrangement represents one example of implementing the loop detector 16. If desired Exclusive-OR gates can be used to multiply $w_k$ with $\hat{w}_k$ and $w_k$ with $\hat{w}_{k+1}$ integrate their outputs and use the integration results to determine when a new component of the input signal is received, and the required phase of the replica of such a component.

Figure 7:
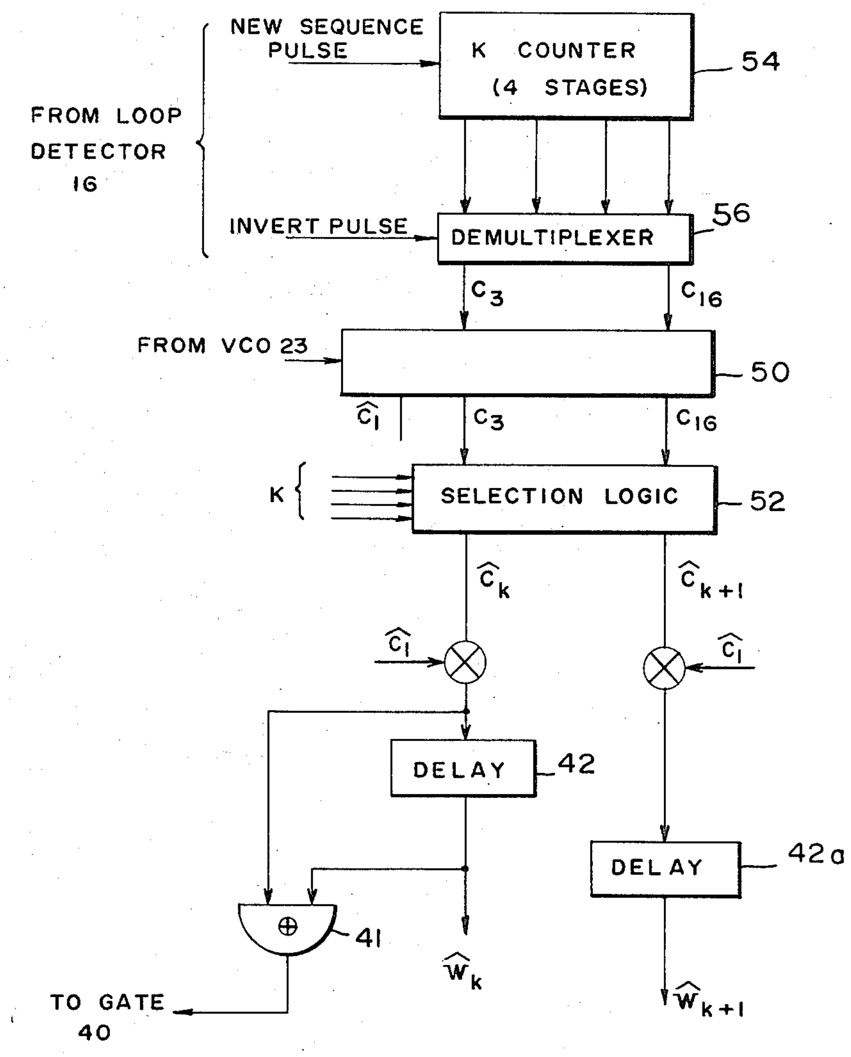
FIG. 7 is another partial block diagram useful in further explaining the code generator shown in FIG. 3.

The arrangement of the code generator 14 shown in FIG. 3 with the switching arrangement 28 is presented for explanatory purposed. In practice electronic circuits are used for the switching arrangement. A simple block diagram of such an arrangement is shown in FIG. 7, in which elements like those previously described are designated by like numerals. Therein, numeral 50 represents a multistage counter which includes both the 3-bit counter 35 and counter 25 of the code generator. It provides $\hat{c}_1$ and $\hat{c}_3$ through $\hat{c}_{16}$ for an embodiment in which the last component is $w_{16}=c_1\cdot c_{16}$. The outputs $c_3$ through $c_{16}$ are supplied to a selection logic unit 52.

Based on the output of a K counter 54, the outputs of two successive stages of counter 50, e.g., $c_3$ and $c_4$, $c_4$ and $c_5$, etc., are supplied by unit 54 to multipliers 26 and 27 as $\hat{c}_k$ and $\hat{c}_{k+1}$. These multipliers are also supplied with $c_1$ to produce $\hat{w}_k$ and $\hat{w}_{k+1}$. Counter 54, which consists of four stages when $c_{16}$ is the last component (since $2^4=16$), is incremented by each New Sequence Pulse from the decision unit 30 of the loop detector 16. Thus counter 54 stores the value *k*. It is supplied to a demultiplexer 56 which is supplied with an invert pulse from the decision unit 30, whenever the phase of the replica of the component has to be reversed by 180° with respect to the received component. Thus the demultiplexer inverts the proper stage of the counter which supplies the new $\hat{c}_k$. As seen since $\hat{w}_k$ is delayed by delay 42, a similar delay unit 42*a* is used to delay $\hat{w}_{k+1}$.

Summarizing the foregoing description in accordance with the present invention, a clean-up loop for a transponder in a $\mu$-system is provided. In the $\mu$-system the range signal is a binary code of sequential components, each component $c_k$ being a square wave of a half the frequency of the preceding component. The highest frequency component ($c_1$), representing the basic system resolution, is not transmitted by itself but acts as a suppressed subcarrier for the other components.

In the clean-up loop a PLL is incorporated together with a code generator which generates a replica of each received code component. The code generator is effectively a multistage counter which is clocked by the output of the PLL. It includes one stage which provides a square wave at the highest system frequency ($\hat{c}_1$) and successive stages which provide square wave outputs at successively lower frequencies ($\hat{c}_k$). Based on the received signal component, the code generator generates a replica of the tracked component and the succeeding code component. The two replica components together with the received code component are correlated to determine when the next code component is received and the necessary phase for its replica.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. In a $\mu$ ranging system of the type in which a range signal is transmitted from a first location to a second location, the range signal consisting of a sequence of components, each compartment having a frequency which is related to the frequency of a preceding component in said sequence, an arrangement in said second location for generating a replica of each of said components, the arrangement comprising:

first means for receiving each component of said range signal;

second means, including a phase locked loop and generating means, the phase locked loop being responsive to said range signal and a first signal on a first output line of said generating means for controlling said generating means to provide a replica of the component of said range signal, which is being received by said first means, on said first output line, said generating means including a second output line for providing thereon a second signal which is a replica of a subsequent component of said range signal, when the replica of the component of the received range signal is on said first output line; and detecting means coupled to said generating means and to said first means for sensing when a subsequent component of said range signal is received and for controlling said generating means to provide a replica of the newly received component of the range signal and a replica of subsequent component on said first and second output lines, respectively.

2. The arrangement as recited in claim 1 wherein said detecting means is responsive to the component replicas on said first and second output lines and the received component for sensing when a subsequent component is received and for controlling said generating means to provide the replica of said subsequently received component on said first output line at a phase related to the subsequently received component.

3. The arrangement as recited in claim 1 wherein said phase locked loop comprises a phase detector, a loop filter and a voltage controlled oscillator and said generating means comprises a multistage counter clocked by the output of said voltage controlled oscillator, and output means including switching means coupled to two successive stages of said counter selected by said switching means in response to control signals from said detecting means for providing the replicas of the received component of said range signal and the succeeding component on said first and second output lines respectively, said arrangement further including means for connecting said phase detector to the output of said first means and to said first output line and for connecting the output of said phase detector to said loop filter and the output of said loop filter to said voltage controlled oscillator.

4. The arrangement as recited in claim 3 wherein said detecting means is responsive to the component replicas on said first and second output lines and the received component for sensing when a subsequent component is received and for controlling said generating means to provide the replica of said subsequently received component on said first output line at a phase related to the subsequently received component.

5. In a $\mu$-type ranging system wherein a range signal from a first location is transmitted to a second location, one of said location being movable with respect to the other, said range signal including a succession of signal components, each component in the sequence having a basic carrier frequency, definable as $c_1$, modulated by a frequency which is half the frequency of the modulating frequency of a preceding component, each component in the sequence being definable as $w_k$, where $w_k = c_1 \cdot c_k$, where $k$ is an integer not less than 2 up to a maximum preselected value, an arrangement in said second location for producing replicas of the components of said range signal, the arrangement comprising:

first means for receiving each component $w_k$ of said range signal;

second means including phase locked means, responsive to the signal component received by said first means, and generator means for providing a replica of the received component and a replica of a succeeding component in said sequence; and third means coupled to said first means and to said generator means for sensing the receipt by said first means of a succeeding component of said range signal.

6. The arrangement as recited in claim 5 wherein said generator means includes first and second output lines, said first output line being connected to said phase lock means whereby when phase lock is achieved by said phase locked means, the signals on said first and second output lines are replicas of the received signal component and a succeeding component in said sequence respectively, definable as $\hat{w}_k$ and $\hat{w}_{k+1}$, respectively.

7. The arrangement as recited in claim 6 wherein said third means are responsive to $w_k$, $\hat{w}_k$ and $\hat{w}_{k+1}$ to provide an indication when a succeeding component, definable as $w_{k+1}$, is received and for controlling said generator means to provide $\hat{w}_{k+1}$ and a replica of succeeding component definable as $\hat{w}_{k+2}$ on said first and second output lines, respectively.

8. The arrangement as recited in claim 6 wherein said generator means comprises a multistage counter including a stage for providing a signal replica at said basic carrier frequency definable as $\hat{c}_1$, and stages for providing signals at frequencies $\hat{c}_k$ where $k$ is greater than 2 and control means responsive to a control signal from said third means for multiplying $\hat{c}_1$ with the signals at a frequency from one stage, definable as $\hat{c}_k$, to provide $\hat{w}_k = \hat{c}_1 \cdot c_k$ on said first output line and for multiplying $\hat{c}_1$ with the signals at a frequency from a succeeding stage, definable as $\hat{c}_{k+1}$, to provide $\hat{w}_{k+1} = \hat{c}_1 \cdot \hat{c}_{k+1}$ on said second output line.

9. The arrangement as recited in claim 8 wherein said third means are responsive to $w_k$, $\hat{w}_k$ and $\hat{w}_{k+1}$ to provide an indication when a succeeding component, definable as $w_{k+1}$, is received and for controlling said generator means to provide $\hat{w}_{k+1}$ and a replica of succeeding component definable as $\hat{w}_{k+2}$ on said first and second output lines, respectively.

10. The arrangement as recited in claim 9 wherein said third means comprises first correlator means for providing an output as a function of the correlation between $w_k$ and $\hat{w}_k + \hat{w}_{k+1}$ and second correlator means for providing an output as a function of the correlation between $w_k$ and $\hat{w}_k - \hat{w}_{k+1}$ and means for controlling the control means of said generator means as a function of the outputs of said first and second correlator means.

* * * * *